Aug. 21, 1951  C. T. NEMIR  2,564,916
MACHINE FOR BLANCHING NUT MEATS
Filed Dec. 1, 1948

Inventor
CLARENCE T. NEMIR
Harvey J. O'Connell
Attorneys

UNITED STATES PATENT OFFICE 2,564,916

MACHINE FOR BLANCHING NUT MEATS

Clarence T. Nemir, Washington, D. C., assignor to K. N. H. Corporation, Washington, D. C., a corporation of Delaware Application December 1, 1948, Serial No. 62,943

9 Claims. (Cl. 146—32)

This invention relates to a machine employing compressed air for blanching nut meats.

Nuts, as for example, peanuts and cashew nuts, have a hard outer shell, and a thin skin or testa on the nut meat. Nut meats which are shelled and have the testa removed bring a high price when sold for human consumption. Furthermore, the testa itself has high nutritive value and is in great demand as a food for chickens, etc.

The process of removing testa from nut meats is called blanching. Great difficulty has been experienced in the blanching of nut meats in such a way as to avoid injury to and breakage of the nut meats. Whole nut meats are, of course, preferred by human consumers. It is therefore a general object of my invention to provide a machine for automatically blanching nut meats on a mass production basis with a minimum of breakage of the nut meats.

In pursuance of this general object and many other objects which will be apparent to those skilled in the art, I provide a vertically-mounted wheel having a plurality of nut blanching chambers on the periphery thereof. Shelled nuts are supplied to the chambers by means of a hopper mounted above the wheel. The wheel is rotated with an intermittent motion, and when the wheel is at rest a compressed air nozzle is inserted into the uppermost chambers for agitating the nuts and thereby removing the testa from the nut meats by air pressure. As the wheel turns and the chambers reach the lower side, the meats and testa fall out into a trough which deposits them on a device for separating the testa from the meats and then the whole meats from the half and broken meats.

A better understanding of the invention will be had from the following specification taken with the appended drawings, wherein:

Figure 1 is a side elevational view of a machine constructed according to the teaching of the invention;

Figure 2 is a perspective view of the top portion of the machine showing a means for inserting the compressed air nozzles into the chambers;

Figure 3 is a perspective view of a cam mechanism forming a part of the machine; and Figure 4 is a fragmentary view showing the nozzle in elevation and the nut blanching chamber in section.

Referring now in greater detail to the drawings, frame structure 9 provides a means for rotatably mounting wheel 10. Wheel 10 has a plurality of nut blanching chambers 11 arranged around the periphery thereof and opening outwardly. Each chamber 11 is substantially cup-shaped, the bottom being more or less semi-spherical in order to avoid pockets or corners which would interfere with the circulatory movement of nuts and air. The chambers are furthermore constructed of, or lined with, rubber or some other non-frangible material that yields upon impact. By the use of this material, nuts that may be thrown forceably against the sides of the chambers during the blanching operation are not damaged or broken. A hopper 12 is mounted above the wheel 10 by brace means 13, and is adapted to fill partially the chambers 11 as they pass around beneath the hopper.

The machine is driven by a motor 15 mounted on the base of frame 9 and power is conveyed from the motor to a speed reducing gear box 16 by means of a belt 17. A pulley 7 on the output side of the gear box 16 drives a shaft 18 by means of belt 19 and pulley 20 on the shaft. As shown to advantage in Figure 3, cam 21, keyed to the shaft 18, has circular contour, with the exception of the concave portion 22. A cam following roller 23 rides on cam 21 and imparts a timed reciprocating motion to connecting rod 24. Rod 24 is pivotally connected at its upper end to a lever 25, the other end of which is pivotally connected at the axis 26 of wheel 10. A ratchet wheel 27 is secured to the axis of wheel 10 and is employed to rotate the wheel 10 with an intermittent motion. This is accomplished by means of a ratchet 28 pivotally mounted on lever 25 in such a way as to engage the ratchet wheel and turn it when the connecting rod 24 moves upwardly in response to movement of the follower wheel 23 on the cam 21. It is thus far apparent that as the shaft 18 and cam 22 rotate, the wheel 10 remains stationary until the follower wheel 23 rides up from the concave portion 22 of the cam 21. The number of teeth on ratchet wheel 27 is equal to the number of nut blanching chambers 11 so that the periphery of wheel 10 moves by an amount equal to the distance between the centers of adjacent chambers for each revolution of the shaft 18.

During the time that wheel 10 is stationary, compressed air nozzles 30 are inserted in holes 31 in the sides of chambers 11, the holes being larger than the nozzles. Two nozzles 30 are provided and arranged on opposite sides of wheel 10 so that two nut blanching chambers 11 can be treated at the same time. The nozzles 30 are adapted to direct a stream of compressed air into the chambers 11 at such an angle as to insure the desired circulatory turbulence within the chambers. Air escapes from the chambers 11 through the holes 31 around the nozzles 30. When the nozzles 30 have been inserted into chambers 11, compressed air is applied, with the result that the shelled nuts in the chambers are greatly agitated. The air stream has the effect of agitating the nuts and dislodging the testa from the nut meats, and in a very short time the nut meats are completely cleaned of testa and the testa is reduced to pulverized form. During the process, the relatively loose parts of the testa that are first removed act as an abrasive in removing the remainder of the testa.

The mechanism whereby the compressed air nozzles 30 are inserted into the chambers 11 and removed therefrom in synchronism with the rotation of the wheel 10 will now be described: Shaft 18 has keyed thereto a second cam 33, having a concave portion 34, disposed on the side of the periphery opposite from that of the concave portion 22 on cam 21. A lever 35 is pivoted at its end 36 to the frame 9 and is pivotally connected at its other end to an actuating rod 37. A cam following roller 38 is mounted intermediate the ends of the lever 35. The actuating rod 37 is pivotally connected at its upper end to the end of a weighted lever 39 having a counterweight 40. The lever 39 is pivotally secured to the frame 9 at 41. A rod 42 is pivotally connected at 43 to the central portion of weighted lever 39. The lower end of rod 42 is secured to a cover 44, which serves to close the openings to the chambers 11 during the blanching stage of the cycle of the machine. The underside of cover 44 is faced with a sheet 48 of rubber or other shock-absorbing material. A cross bar 45 is rigidly secured to the rod 42 at 46. Each end of cross bar 45 is provided with a pair of rollers 47. Vertical swing rods 49 are pivotally connected at their upper ends 50 to the frame 9 and are disposed between the rollers 47. The lower ends of vertical swing rods are bifurcated at 51 and adapted to cause air nozzles 30 to slide back and forth on rails 52. Wedges 53 are secured to vertical swing rods 49 adjacent the rollers 47 in such a way that vertical movement of cross bar 45 will result in a swinging movement of swing rods 49 about their axes 50. When cross bar 45 moves up, swing rods 49 and air nozzles 30 move away from wheel 10; and when bar 45 moves down, rods 49 and nozzles 30 move toward wheel 10.

Shaft 18 has keyed on one end thereof a sprocket wheel 60 carrying a chain 61. Chain 61 is also trained over a second sprocket wheel 62 which drives a cam 63. The second sprocket 62 and cam 63 are rotatably mounted on frame 9. An air valve 64 is also mounted on frame 9 and is so related with the cam 63 that it can be actuated by a follower arm 65, one end of which has a cam following roller 66 riding on the cam and the other end of which is pivotally secured at 67. The air valve 63 is connected to a source of compressed air (not shown) and it acts to turn on and off the compressed air applied through hose 69 to nozzle 30.

The synchronized operation of the apparatus thus far described is as follows: When the cam following roller 23 moves from the bottom of concave portion 22 of cam 21, connecting rod 24 is pushed upwardly and ratchet 28 turns ratchet wheel 27 and wheel 10, thereby moving the next chamber 11 into position alongside air nozzle 30. After the wheel 10 has come to rest, the second cam 33 acts through lever 35 and causes actuating rod 37 to move down. This, in turn, pulls weighted lever 39 and rod 42 down. Cover 44 fastened to the bottom of rod 42 moves down, closes the openings to chambers 11, and exerts a braking influence on wheel 10. The cross bar 45, which is also fastened to rod 42, simultaneously moves down, and by the action of rollers 47 on wedge blocks 53, the vertical swing rods 49 are made to act on air nozzles 30 and move them through holes 31 into chambers 11.

At this point in the cycle, cam 63 acts on cam-following lever 65 and opens the air valve 64 admitting air from the source through hose 69 and nozzle 30 into the chambers 11. The blanching operation, thus begun, continues during the time required for the cams to turn approximately 270 degrees, at the end of which time lever 65 rides down into the concave portion of cam 63 and closes valve 64, thereby shutting off the air to the nozzle 30. Then follower 38 on lever 35 drops down into concave portion 34 of the second cam 33. The actuating rod 37 therefore moves upwardly, causing rod 42 to move upwardly and, in consequence thereof, cover 44 moves up and cross bar 45 causes vertical swing rods 49 to swing outwardly, withdrawing air nozzles 30 from the chambers 11. At this point in time cam-follower 23 has reached the bottom of concave portion 22 of the first cam 21 and the cam then pushes the connecting rod 24 upwardly. In so doing, ratchet 28 on lever 25 acts on ratchet wheel 27 and causes the wheel 10 to move by an amount such that the next succeeding chamber 11 is positioned adjacent to the nozzle 30. The cycle of operation is then repeated.

From the foregoing it is apparent that the machine is completely automatic in operation and that the various steps in the cycle of operation are properly synchronized with each other.

A V-shaped trough 70 is provided to receive the contents of chambers 11 as they move around to dumping position on the lower side of wheel 10. The mixed nut meats and testa fall from the trough 70 to a separator-grader comprising parallel spaced grading rolls 71, chute 72, and conveyor 73. The testa, being more or less pulverized, falls between rolls 71, down chute 72, and into collecting receptacle 74. The nut meats however are too large to pass between the rolls 71 and are conveyed by helical ribs 75 on the rolls, the rolls being driven by motor 15 through belt 77, shaft 78 and belt 79. The rolls 71 decrease in diameter toward the other end so that first the smallest pieces fall through between the rolls, and then larger pieces, and finally whole nut meats fall through to the conveyor belt. Fences 80 positioned on the belt guide the graded nut meats to the collection containers 81 at the end of the conveyor, each container 81 receiving nut meats of a different size grade.

The operation of the machine is completely automatic. Shelled nuts are supplied to hopper 12, testa is collected in receptacle 74, and nut meats graded according to size are collected in containers 81.

While the invention has been described in detail in its present preferred embodiment, it will, of course, be understood that such has been done for purposes of illustration only and not by way of limitation, and therefore only such limitations are to be imposed thereon as may reasonably come within the scope of the appended claims.

What I claim is:

1. A nut blanching machine comprising a power source, a wheel adapted to rotate about a horizontal axis, a plurality of nut blanching chambers arranged about the wheel with the open ends forming a part of the periphery thereof, a stationary feed hopper arranged over one portion of the wheel for depositing a load of nuts to be blanched into the chamber positioned in operative relation therewith, a closure member adjustable radially about another portion of the wheel for sealing off one or more of said chambers when in one position of adjustment and for releasing said chambers when in inoperative position of adjustment, air injection means adjustable into and out of positions for introducing turbulent streams of air into said chambers when sealed by said closure member, and an operative connection between said power source and said wheel, closure member and air injecting means for controlling adjustment thereof in predetermined consecutive order.

2. A nut blanching machine comprising a power source, a wheel adapted to rotate about a horizontal axis, a plurality of nut blanching chambers arranged about the wheel with the open ends forming a part of the periphery thereof, a stationary feed hopper arranged over one portion of the wheel for depositing a load of nuts to be blanched into the chamber positioned in operative relation therewith, a closure member adjustable radially about another portion of the wheel for sealing off one or more of said chambers when in one position of adjustment and for releasing said chambers when in inoperative position of adjustment, air injection means adjustable into and out of positions for introducing turbulent streams of air into said chambers when sealed by said closure member, outlet means beyond the closure member but in advance of the feed hopper for permitting dumping of the blanched nuts by gravitational force, and means operatively connecting said power source with said wheel, closure member and air injecting means for controlling operation thereof in perdetermined order.

3. A nut blanching machine comprising a power source, a wheel adapted to rotate about a horizontal axis, a plurality of nut blanching chambers arranged about the wheel with the open ends forming a part of the periphery thereof, a stationary feed hopper arranged over one portion of the wheel for depositing a load of nuts to be blanched into the chamber positioned in operative relation therewith, a closure member adjustable radially about another portion of the wheel for sealing off one or more of said chambers when in one position of adjustment and for releasing said chambers when in inoperative position of adjustment, air injection means adjustable into and out of positions for introducing turbulent streams of air into said chambers when sealed by said closure member, and means responsive to said power source for actuating said wheel in step-wise turning movements in increments corresponding to the distance between the open ends of said blanching chambers so as to advance each of the chambers one position in the direction from the feed hopper to the sealing and air injection means and other means successively to cause the closure member to be actuated into sealing relation followed by advance of the air injection means toward operative position of adjustment for introducing turbulent air streams into the sealed chamber for agitating the nuts to effect blanching, followed in consecutive order by reversal into movement of the air injection means and closure member means toward inoperative position of adjustment prior to actuation of the wheel through the next step-wise turning movement.

4. A nut blanching machine as claimed in claim 1 in which cam and rack means comprise the operative connection between said power source and said wheel for controlling the step-wise movement of the wheel.

5. A nut blanching machine as claimed in claim 1 in which cam and lever means comprise the operative connection between the power source and the closure member for regulating adjustment of said closure member between sealing and unsealing positions of adjustment.

6. A nut blanching machine as claimed in claim 1 in which cam and lever means comprise the operative connection between the power source and the closure member for controlling adjustment of the closure member between sealing and unsealing positions of adjustment and other cam and lever means responsive to movement of the closure member comprise means for adjusting the air injection means into operative and inoperative positions of adjustment.

7. A nut blanching machine as claimed in claim 1 which includes means for guiding said air injection means during movement between operative and inoperative positions of adjustment.

8. A nut blanching machine as claimed in claim 1 which includes means operatively connected to the power source for establishing communication between said air injection means and a compressed air source in timed relation with the movement of the air injection means into and out of operative position of adjustment.

9. A nut blanching machine as claimed in claim 1 in which the nut blanching chambers comprise cup shaped members lined with resilient material.

CLARENCE T. NEMIR.

REFERENCES CITED

The following references are of record in the file of this patent:

UNITED STATES PATENTS

| Number | Name | Date |
| --- | --- | --- |
| 1,206,258 | Salomon | Nov. 28, 1916 |
| 1,461,265 | Bullard | July 10, 1923 |
| 1,822,375 | Ryder | Sept. 8, 1931 |
| 1,976,801 | Nicholoy | Oct. 16, 1934 |
| 2,086,539 | De Bethune | July 13, 1937 |
| 2,346,561 | Delay | Apr. 11, 1944 |
| 2,445,881 | Hemmeter | July 27, 1948 |
| 2,490,112 | Winters | Dec. 6, 1949 |